(12) United States Patent
Jensen (10) Patent No.: US 9,353,866 B2
(45) Date of Patent: May 31, 2016

(54) SEAL ASSEMBLY WITH COMPLEMENTARY SURFACE DEFORMATIONS

(71) Applicant: Caterpillar Inc., Peoria, IL (US)

(72) Inventor: Jeffrey E. Jensen, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 98 days.

(21) Appl. No.: 14/255,386

(22) Filed: Apr. 17, 2014

(65) Prior Publication Data

US 2015/0300498 A1 Oct. 22, 2015

(51) Int. Cl.
*F16J 15/34* (2006.01)
*B62D 55/088* (2006.01)
*B62D 55/21* (2006.01)

(52) U.S. Cl.
CPC ............ *F16J 15/344* (2013.01); *B62D 55/0887* (2013.01); *B62D 55/21* (2013.01)

(58) Field of Classification Search
CPC ..... F16J 15/34; F16J 15/3404; F16J 15/3408; F16J 15/3412; F16J 15/3428; F16J 15/3432; F16J 15/3436; F16J 15/344; F16J 15/3448; F16J 15/3452; F16J 15/3456; B62D 55/0887; B62D 55/21
USPC ........... 305/100, 103, 104; 277/379, 381, 382
See application file for complete search history.

(56) References Cited

U.S. PATENT DOCUMENTS

| | | | |
|---|---|---|---|
| 4,062,550 A * | 12/1977 | Satsumabayashi | .. F16J 15/3456 277/380 |
| 4,183,542 A | 1/1980 | Quartara | |
| 4,461,488 A | 7/1984 | Harms et al. | |
| 4,560,174 A | 12/1985 | Bisi | |
| H1180 H * | 5/1993 | Arianoutsos | ........... F16J 15/344 277/381 |
| 5,763,956 A | 6/1998 | Metz et al. | |
| 5,794,940 A * | 8/1998 | Brueggmann | ....... F16J 15/3456 277/364 |
| 6,209,185 B1 | 4/2001 | Scott | |
| 7,004,474 B2 | 2/2006 | Takahashi et al. | |
| 7,377,518 B2 * | 5/2008 | Lai | ....... F16J 15/3408 277/400 |
| 8,360,534 B2 | 1/2013 | Vom Stein | |
| 8,985,590 B2 * | 3/2015 | Liang | .................. B62D 55/211 277/549 |
| 9,115,560 B2 * | 8/2015 | Shaw | ...................... E21B 33/04 |
| 2006/0022411 A1 | 2/2006 | Beardsley et al. | |
| 2011/0248561 A1 | 10/2011 | Dolata | |
| 2012/0267859 A1 | 10/2012 | Liang et al. | |
| 2012/0267947 A1 | 10/2012 | Johannsen et al. | |

* cited by examiner

*Primary Examiner* — John Walters
(74) *Attorney, Agent, or Firm* — Miller, Matthias & Hull LLP (57) ABSTRACT

A seal assembly is disclosed which may include a seal ring, a load ring in engagement with the seal ring, and complementary surface deformations in the seal ring and load ring, the complementary surface deformations circumscribing the seal ring and the load ring, the complementary surface deformations being continuous and non-circular.

20 Claims, 10 Drawing Sheets

FIG. 11

SEAL ASSEMBLY WITH COMPLEMENTARY SURFACE DEFORMATIONS

FIELD OF THE DISCLOSURE

The present disclosure generally relates to seal assemblies and, more particularly, relates to seal assemblies used in association with track or linkage pins of earth moving equipment.

BACKGROUND OF THE DISCLOSURE

Machines used in earth moving, agricultural and construction applications are subjected to extreme wear. The moving components of such machines need to be provided with a constant supply of lubrication and do so while limiting the loss of that lubrication to the environment and inflow of debris from the worksite into the lubrication supply.

Two examples of such machines are track-type tractors and wheeled loaders. With a track-type tractor, a pair of continuous tracks are provided so as to provide locomotion to the machine. The tracks are trained around a plurality of drive sprockets and idlers with an engine of the machine rotating the drive sprockets. This in turn rotates the track over the sprockets and idlers. The track itself its comprised of a number of individual track shoes connected by track links. The track links are themselves connected through a plurality of bushings and track pins to allow for the track to pliably move around the sprockets and idlers while at the same time ensuring the structural integrity of the track remains in place. In such an embodiment, it can therefore be seen that the supply of lubrication to such track pins is of the utmost importance.

Another example is with respect to the aforementioned wheeled loader. With such a machine, a pair of boom arms are pivotally attached to the machine and are in turned pivotally connected to a bucket or other work implement. Alternatively, a secondary set of arms may be interposed between the boom arms and the work implement. Hydraulic cylinders powered by the engine of the machine allow for the movement of the arms and work implements. With each pivot or joint, however, a linkage pin needs to be provided to, in a manner similar to the aforementioned track-type tractor track pins, maintain the physical connections between the components while at the same time allowing for movement. Such linkage pins in turn require a continuous supply of lubrication as described above.

Over the years, a number of different configurations have been used in an attempt to provide such lubrication while preventing the loss of the lubrication and inflow of debris, e.g., dirt, dust, and moisture into the lubrication supply. For example, it is well known, such as in U.S. Pat. No. 4,560,174, to provide a lubrication cavity proximate such pins, with a seal assembly disposed within the lubrication cavity. The seal assembly itself can be provided in any number of different ways such as by providing a seal ring proximate to the pin, and a load ring positioned between a seal ring and the lubrication cavity so as to bias the seal ring toward the pin. The seal assembly components can be manufactured from flexible materials so as to allow a certain degree of play, but at the same time allow for direct contact between the components of the seal assembly, the lubrication cavity, and the pin, bushings, and/or spacers associated with the seal assembly.

With any of the aforementioned types of seal assemblies it is important for the load ring to maintain contact with the seal ring so as to accomplish all of the foregoing objectives, i.e., biasing the seal ring toward the pin, limiting outflow of lubricant, and preventing inflow of debris. Accordingly, it has been known to provide a number of different configurations for maintaining contact between the load ring and seal ring such as providing splines on one or both of the load ring and seal ring. In so doing, rotational translation between the two components is hopefully avoided. However, continuous improvement in such seal assemblies is always being sought and it is desirable to provide such a seal assembly which accomplishes all the foregoing objectives, while at the same time even further limiting the movement of the load ring relative to the seal ring in all directions.

SUMMARY OF THE DISCLOSURE

In accordance with one aspect of the disclosure, a seal assembly is therefore provided which may comprise a seal ring, a load ring in engagement with seal ring, and complementary surface deformations in the seal ring and load ring, the complementary surface deformations being continuous and non-circular.

In accordance with another aspect of the disclosure, an undercarriage link joint assembly is provided which may comprise a plurality of links, a pin connecting adjacent links and including first and second ends, a bushing surrounding the pin, and a seal provided at the first and second ends, wherein the seal includes a seal ring, a load ring and complementary surface deformations in the seal ring and the load ring, the complementary surface deformations being continuous and non-circular.

In accordance with yet another aspect of the disclosure, a method of assembling a seal assembly is disclosed which may comprise providing a seal ring, providing a load ring proximate the seal ring, and connecting the load ring to the seal ring using complementary surface deformations, the complementary surface deformations being continuous and non-circular.

These and other aspects and features of the disclosure will be more readily understood upon reading the following detailed description when taken in conjunction with the accompanying drawings.

While the following detailed description will be given with respect to certain illustrative embodiments, it should be understood that the drawings are not necessarily to scale and the disclosed embodiments are sometimes illustrated diagrammatically and in partial views. In addition, in certain instances, details which are not necessary for an understanding of the disclosed subject matter or which render other details too difficult to perceive may have been omitted. It should therefore be understood that this disclosure is not limited to the particular embodiments disclosed and illustrated herein, but rather to a fair reading of the entire disclosure and claims, as well as any equivalents thereto.

DETAILED DESCRIPTION

Figure 1:
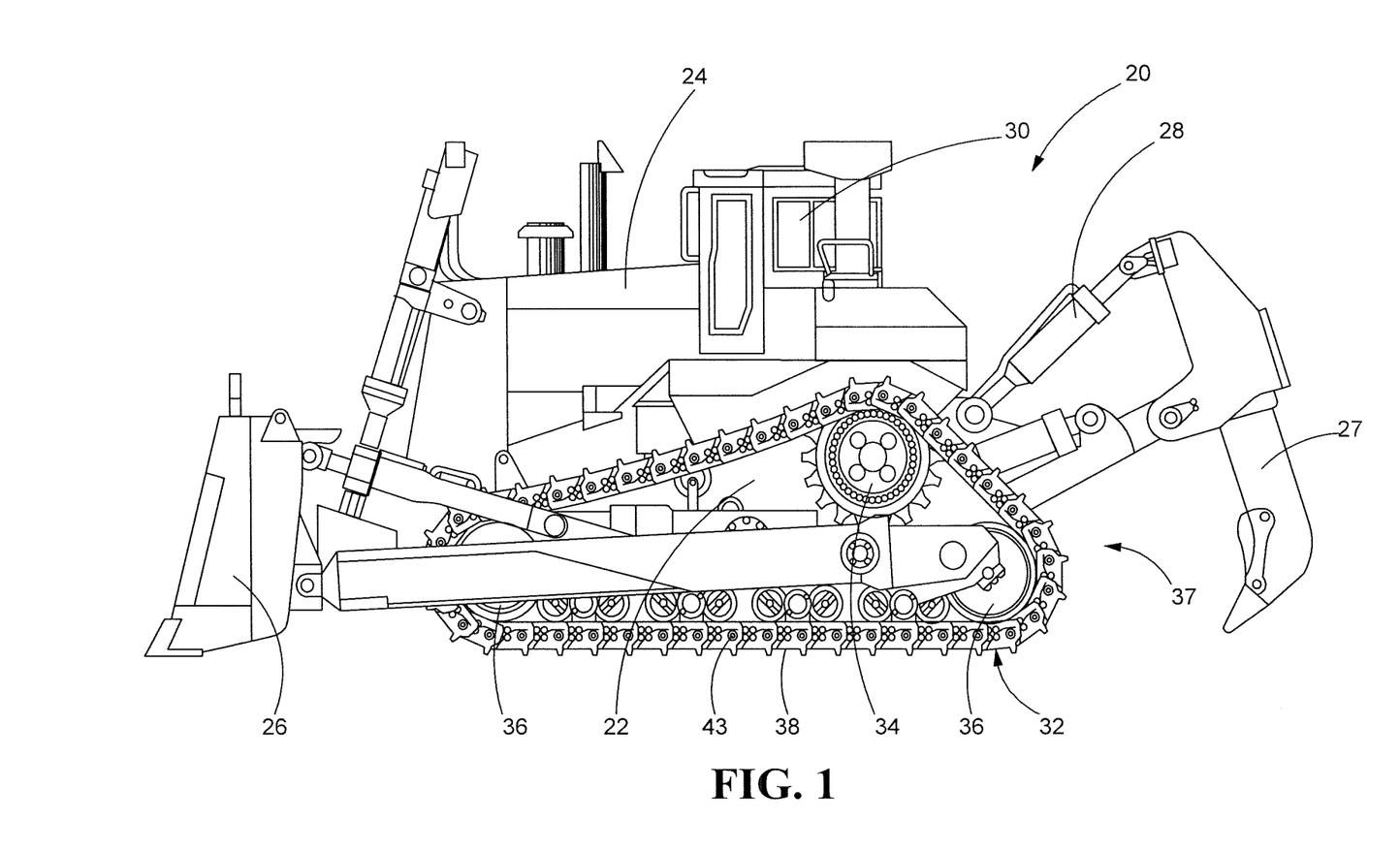
FIG. 1 is a side view of a machine constructed in accordance with the present disclosure and including a plurality of track pins.

Turning now to the drawings, and with specific reference to FIG. 1, a machine constructed in accordance with the teachings of the disclosure is generally referred to by reference numeral 20. While machine 20 is depicted as a track-type tractor having bulldozing and ripping capabilities, it is to be understood that the teachings of the disclosure are not so limited but rather can be employed in any number of different machines including but not limited to track-type tractors, loaders (wheeled and tracked), motor graders, pipe layers, excavators, mining equipment or miners, paving equipment or pavers, and trucks.

Turning again to FIG. 1, the machine 20 is shown to include a chassis 22 which is mounted on an engine 24. Typically, the engine 24 is a diesel engine, but any number of other types of engines and prime movers including but not limited to Otto cycle internal combustion engines and electric motors are possible. The machine 20 further includes a blade 26 for performing useful work but of course any number of other types of work implements can be so attached. Similarly, on the rear of the machine 20 it will also be noted that the machine 20 is provided with a ripper 27. As is customary, a plurality of hydraulic cylinders 28 are provided for movement of the work implements 26, 27. Finally, an operator cabin 30 is also mounted on the chassis 22, behind the engine 24, for housing the operator of the machine and enabling operation of same.

Since FIG. 1 illustrates that the machine 20 as a track-type tractor, it is depicted as employing a pair of continuous tracks 32 trained around a drive sprocket 34 and a plurality of idlers 36, all of which in combination form an undercarriage 37. As the engine 24 causes the drive sprocket 34 to rotate, the track 32 is in turn rotated around the drive sprocket 34 and the idlers 36.

Figure 3:
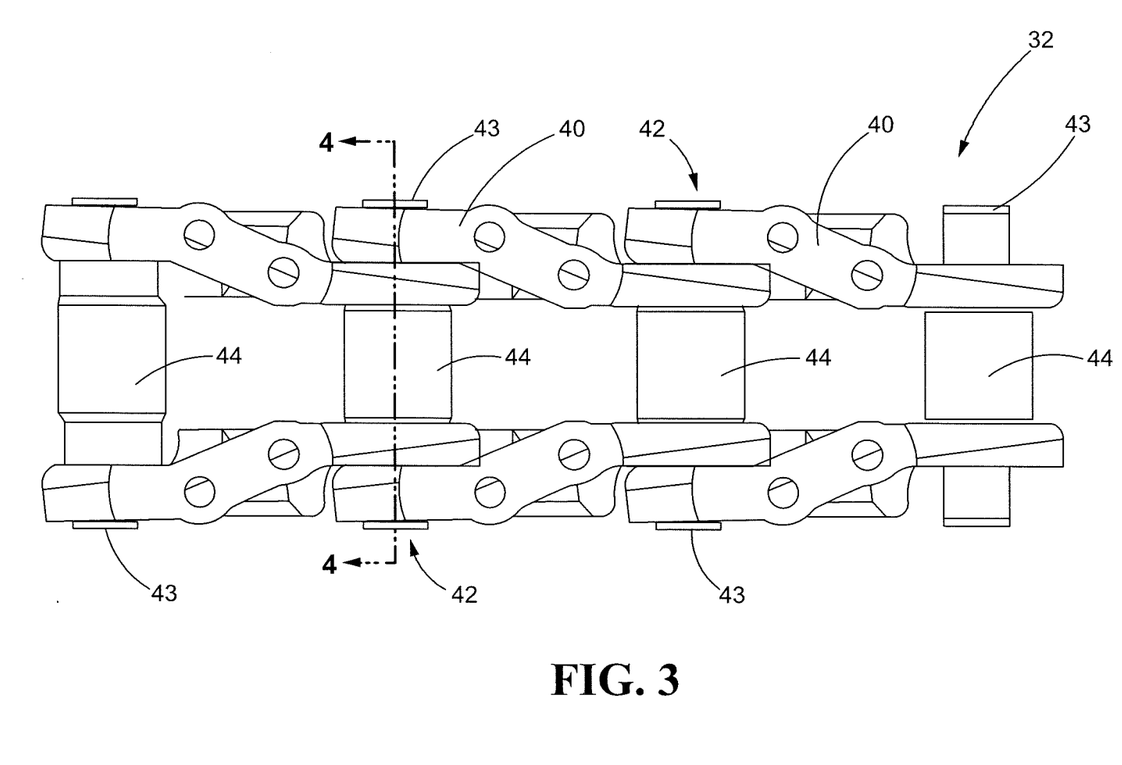
FIG. 3 is a plan view of a track used on a track-type tractor such as that of FIG. 1 and showing a plurality of track links connected by a plurality of track pins.

The track 32, itself, is comprised of a plurality of shoes 38 each interconnected by a plurality of track links 40 as shown best in FIG. 3. As will be noted therein, the track links 40 are pivotally joined together by way of a plurality of track joints 42, each including track pins 43 and bushings 44 as will be described in greater detail herein. It is at these track joints 42 that lubrication is needed as indicated above.

Figure 2:
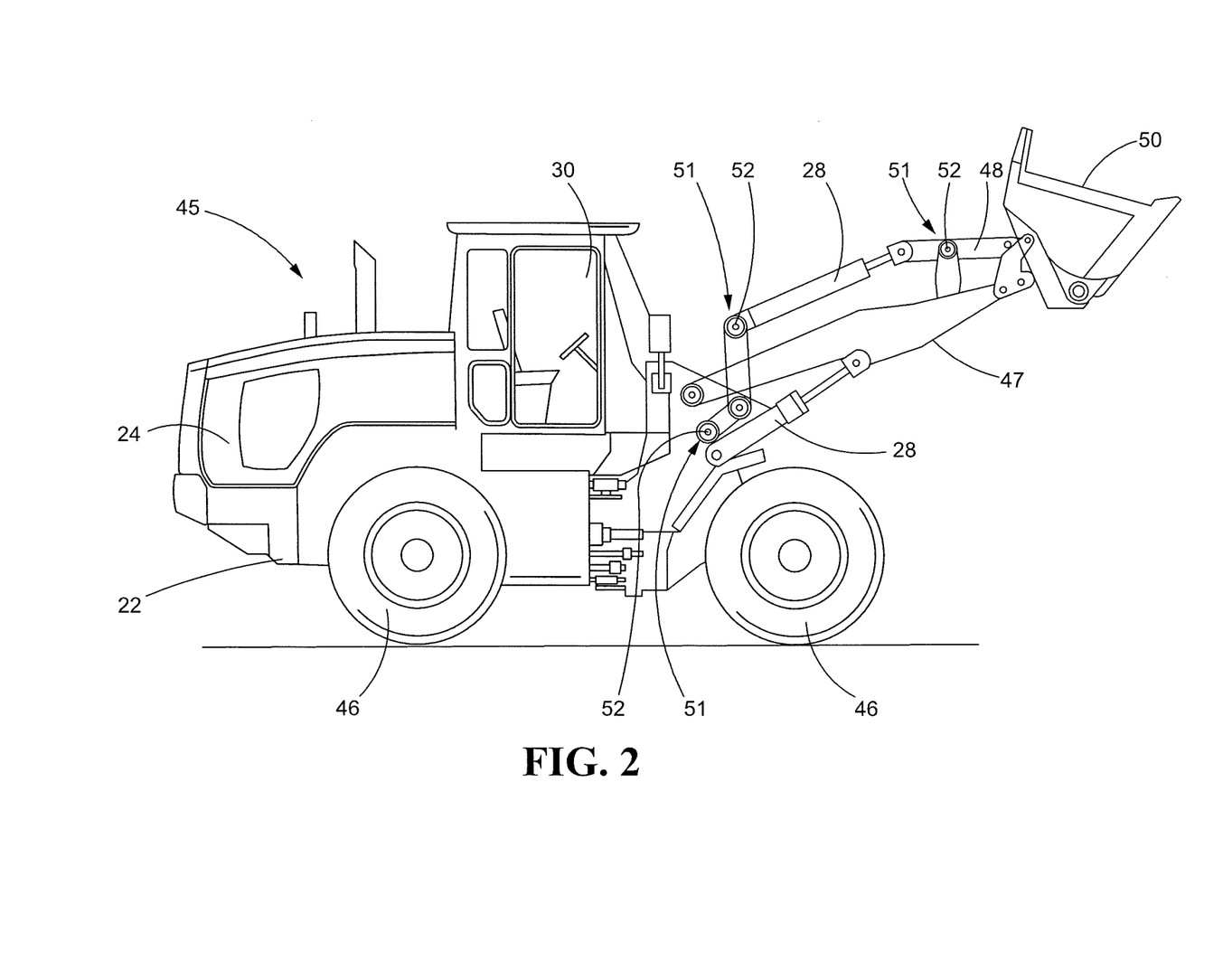
FIG. 2 is a side view of another machine constructed in accordance with the teachings of the disclosure and including a plurality of linkage pins.

In a similar fashion, the machine 20 of FIG. 2 shows another type of pin which can advantageously employ the teachings of the present disclosure. As shown therein, the machine 20 may be a wheeled loader 45. Similar to the machine 20 of FIG. 1, the wheeled loader 45 includes chassis 22 on which is mounted engine 24 and operator cabin 30. As opposed to tracks 32, however, the wheeled loader 45 is shown including wheels 46. Of course loader 45 can also be of a tracked variety as well. The wheeled loader 45 further includes a pair of boom arms 47, to which are mounted a pair of extension arms 48, and to which are pivotally mounted a bucket 50. At the junctions 51 between each of the boom arms 47, extension arms 48 and bucket 50, it can be seen that a pin, referred to as a linkage pin 52, is provided. The linkage pin 52 is similar to the track pin 43 in that it is also in need of constant lubrication, and therefore benefits from the teachings of the present disclosure.

Figure 4:
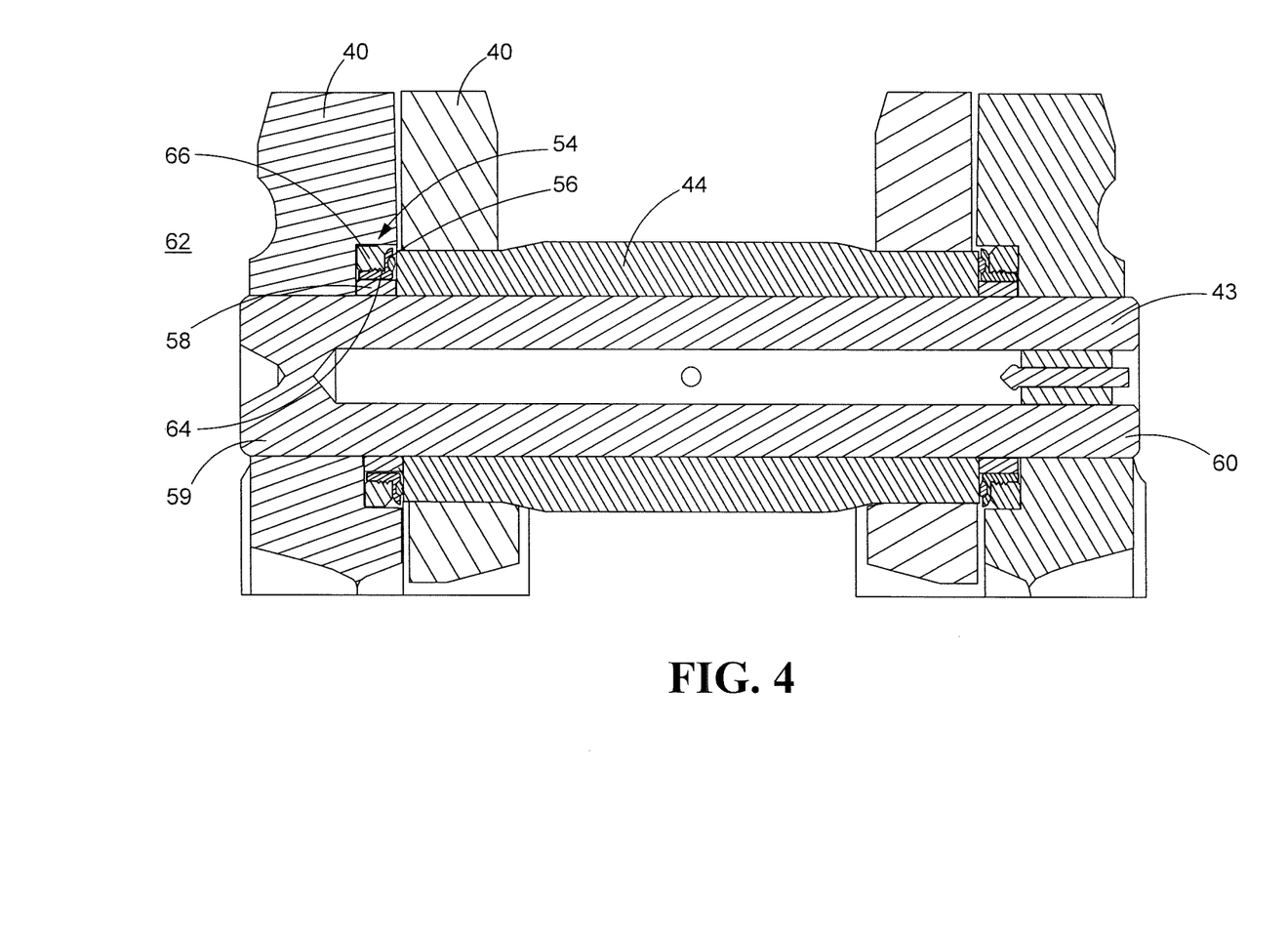
FIG. 4 is a sectional view taken along line 4-4 of FIG. 3 and showing an undercarriage link joint assembly constructed in accordance with the teachings of this disclosure.

Turning to FIG. 4, an enlarged sectional view of the track links 40, track joints 42, track pin 43 and bushing 44 of FIG. 3 is depicted. Of course, it is to be understood that although a separate sectional view of the linkage pin 52 is not herein provided, a seal or seal assembly 54 according to the present disclosure can be used therewith in equal efficacy as well. As shown on FIG. 4, the seal assembly 54 is positioned within a lubrication cavity 56, itself provided within the track link 40. The track link 40 encloses two sides of the lubrication cavity 56, with a spacer 58 and a bushing 44 substantially closing off the other two sides of the lubrication cavity 56. In so doing a relatively self-enclosed lubrication cavity 56 is provided at first and second ends 59 and 60 of the track pin 43. In order to prevent outflow of lubrication (not shown but provided within the lubrication cavity 56) to the environment 62, while at the same time directing a lubricant to each of the foregoing components, the seal assembly 54 is positioned within the lubrication cavity 56. In combination, the links 40, track pin 43, bushing 44 and seal assembly 54 form an undercarriage link joint assembly 63.

Figure 5:
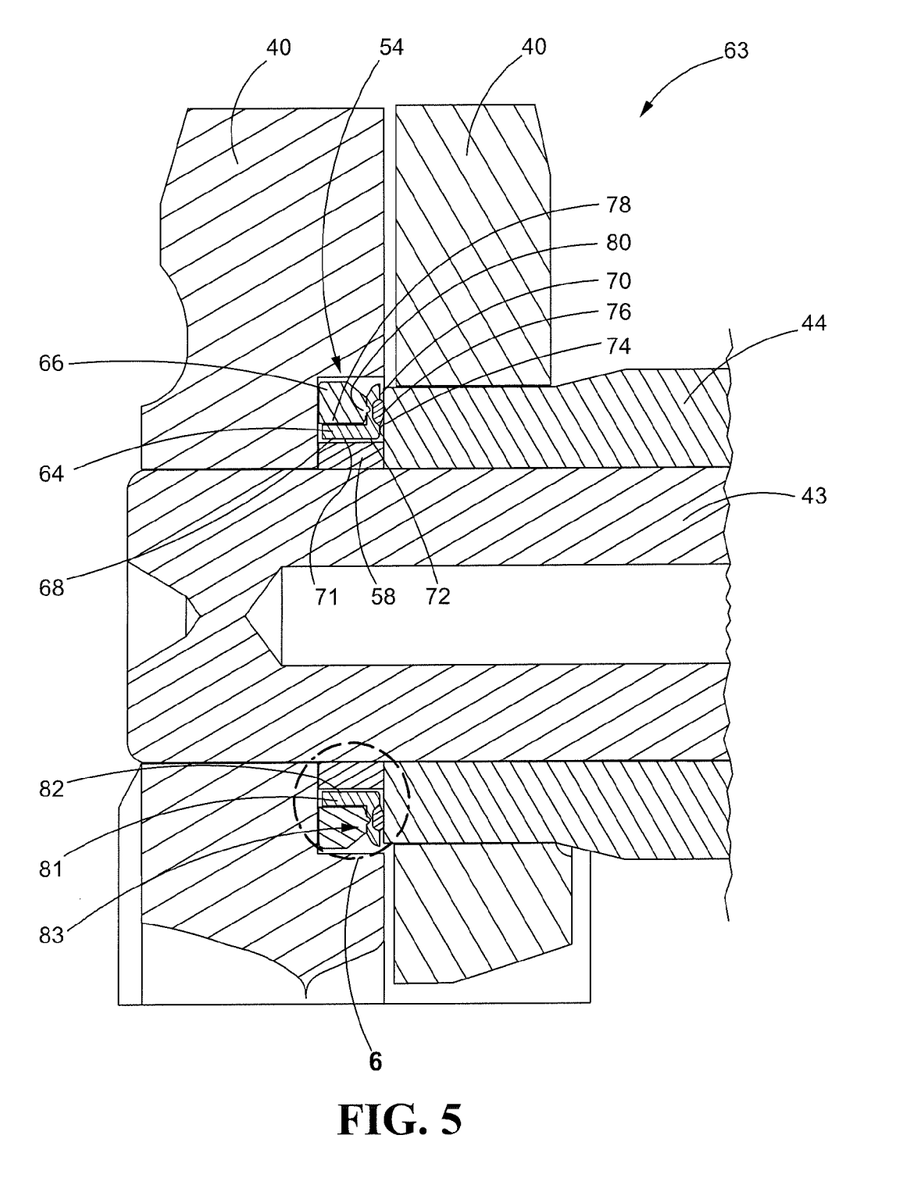
FIG. 5 is an enlarged view of one end of the track pin of FIG. 4 and depicting the undercarriage link joint assembly in greater detail.

Turning now to FIG. 5, the seal assembly 54 and undercarriage link joint assembly 63 is shown in even greater detail. The seal assembly 54 includes a seal ring 64, sometimes referred to as lip seal, and load ring 66. The seal ring 64 may include an axial arm 68 as well as a radial arm 70. As will be noted, the axial arm 68 extends along an axial surface 71 of the spacer 58 with a pathway 72 provided therebetween for passage of lubricant. The radial arm 70, on the other hand, extends radially away from the axial arm 68 along a radial edge 74 of the bushing 44. In order to provide engagement between the seal assembly 54 and the bushing 44, a flexible seal lip 76 may also be provided.

As the seal ring 64 needs to be biased toward to the spacer 58 and bushing 44, the load ring 66 is provided and compressed between the track link 40 and the seal ring 64. The load ring 66, may include an axial surface 78 for engagement with the axial arm 68 of the seal ring 64, as well as a radial surface 80 for engagement with the radial arm 70.

In order to provide this biasing force, while at the same time sealing the lubrication within the lubrication cavity 56 and preventing inflow of debris from the environment 62, the load ring 66 may be made of flexible material such as rubber. The seal lip 76 may be made of a similar elastomeric material such as rubber. The seal ring 64, on the other hand, may be provided with more structural rigidity and therefore may be manufactured from a core 81 of metal such as steel or steel cladded in stainless steel. In addition, in order to provide a certain degree of flexibility as well as sealability, the metal core 81 may then in turn be coated with a polymeric material 82. The specific material from which the lip seal coating 82 is manufactured will be dictated by the ultimate application of the seal assembly 54. For example, with linkage pins 52, it may be advantageous to manufacture the polymeric coating 82 from a softer polymer, whereas with the track pin 43, it may be advantageous to manufacture the polymeric coating 82 from a harder material.

In order to ensure the long term viability of the seal assembly 54, as well as its consistent ability to prevent leakage of lubricant of the lubrication cavity 56 and inflow of debris, it is important that the load ring 66 maintain constant engagement with the seal ring 64. This has proven challenging with respect to prior art efforts in this regard as constant motion of the aforementioned components, particularly in the harsh environs in which they typically operate, can cause the load ring 66 to rotate around, and axially translate relative to, the seal ring 64. Over time, this rotation of the load ring 66 around the seal ring 64 can cause the seal assembly 54 to lose effectiveness with prior art seal assemblies. However, in this regard the present disclosure drastically departs from the teachings of the prior art. It does this by providing complementary surface deformations as will be described in further detail herein.

Figure 6:
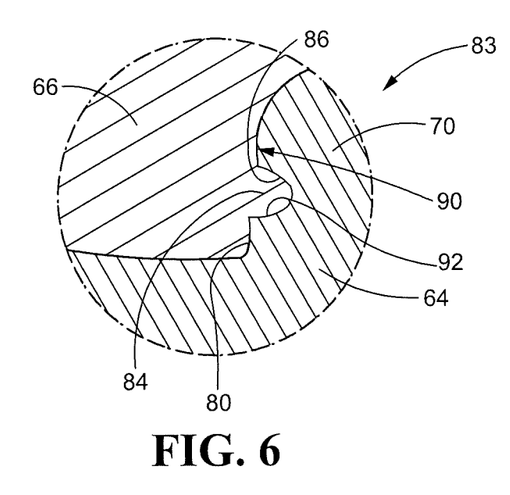
FIG. 6 is an enlarged sectional view of area 6 of FIG. 5 and showing complementary surface deformations constructed in accordance with the teachings of the present disclosure.

Turning now to FIG. 6, these complementary surface deformations 83 are shown in greater detail. As defined herein, "complementary surface deformations" are understood to mean features which extend away from or recess into a plane, such as protrusions and indentations, and which are shaped so as to allow for one to be inserted into the other in nesting fashion. For example, a protrusion extending from the seal ring 64 will have a matching or complementary indentation in the load ring 66 into which the protrusion fits, and vice versa.

In the embodiment of FIG. 6, the complementary surface deformations 83 are shown as a protrusion 84 extending from the load ring 66, and a complementarily shaped indention 86 on the seal ring 64. More specifically, the protrusion 84 extends from the radial surface 80 of the load ring 66 toward the seal ring 64, while the indentation 86 is a recess provided in the radial arm 70 of the seal ring 64 and adapted to receive the protrusion 84. Moreover, as shown in FIG. 5, both the protrusion 84 and the indentation 86 circumscribe the load ring 66 and the seal ring 64, respectively, so as to provide a complete and continuous labyrinthine pathway 90 to prevent passage of lubricant and debris. This is accomplished in that the labyrinthine pathway 90 includes a number of different surfaces or facets 92 at which the load ring 66 and the seal ring 64 meet, engage and turn. This greatly inhibits the ability of the lubricant to escape to the environment 62, while at the same time also severely limiting the ability of debris from entering from the environment 62.

In addition, the complementary surface deformations 83 not only circumscribe the seal assembly 54, but do so with a continuous and non-circular fashion. In doing so, the tendency of the load ring 66 to rotationally move relative to the seal ring 64, as has been an issue with respect to prior art attempts, is entirely avoided. Even though the operational forces to which the seal assembly 54 will be subjected as the machine 20 operates will tend to bias the load ring 66 in such a direction, the seal assembly 54 will not allow for such movement. In turn, the load ring 66 cannot become disengaged, or less engaged, with the seal ring 64 and the operational efficacy of the seal assembly 54 is maintained throughout the operation of the machine 20.

Figure 7:
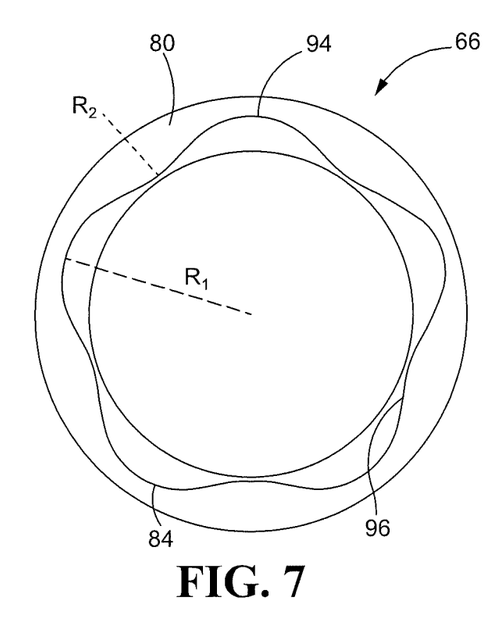
FIG. 7 is a plan view of a load ring having a continuous and non-circular surface deformation.

More specifically, the protrusion 84 and indentation 86 may be provided with a major arc 94 having a first radius $R_1$, and one or more minor arc(s) 96 having a second radius $R_2$, as shown best in FIG. 7. As can be seen, the second radius $R_2$ is different that the first radius $R_1$. In so doing, when the protrusion 84 is nested within the indentation 86, the load ring 66 cannot rotate relative to the seal ring 64. In addition, it is important to note that while the embodiment of FIGS. 5-7 depict complementary surface deformations 83 which are wavy, symmetrical and continuous, many other non-circular and continuous shapes will work and are included in this disclosure as well as noted below.

Figure 8:
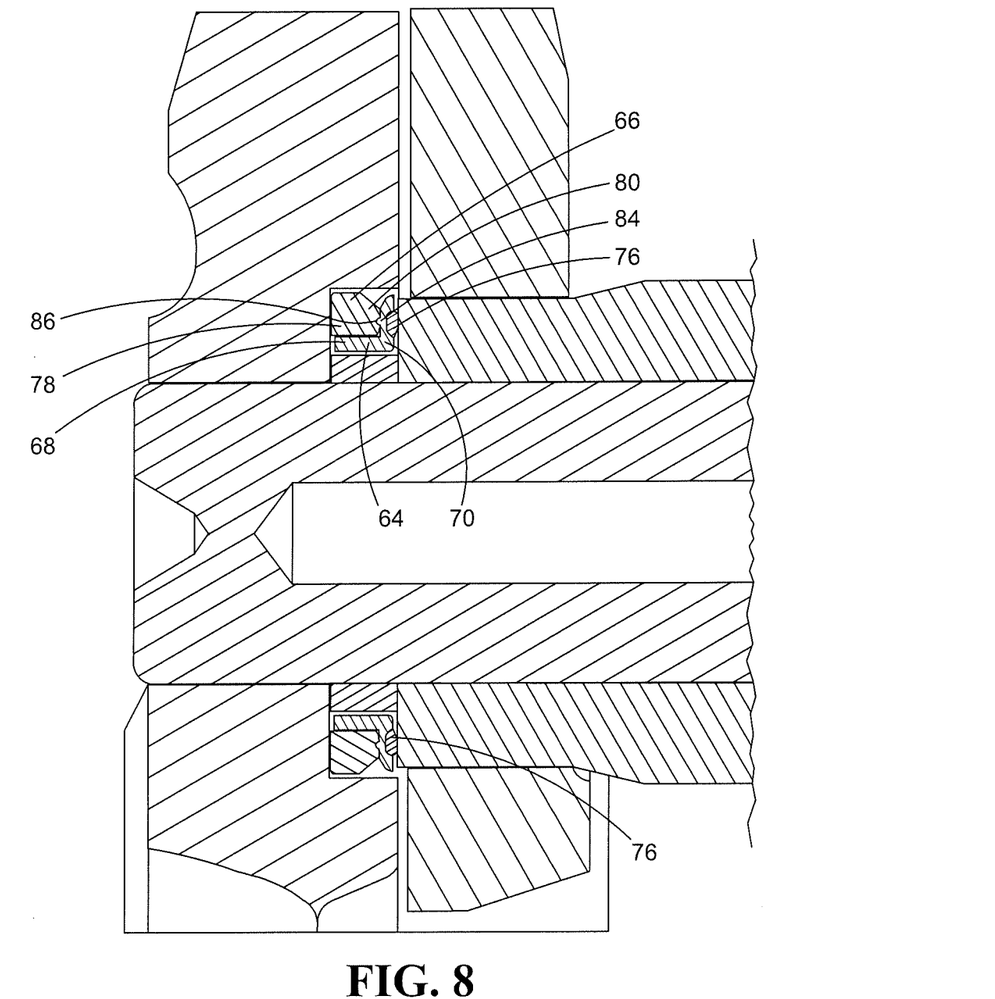
FIG. 8 is a sectional view similar to FIG. 5, but showing an alternative embodiment of the present disclosure.
Figure 9:
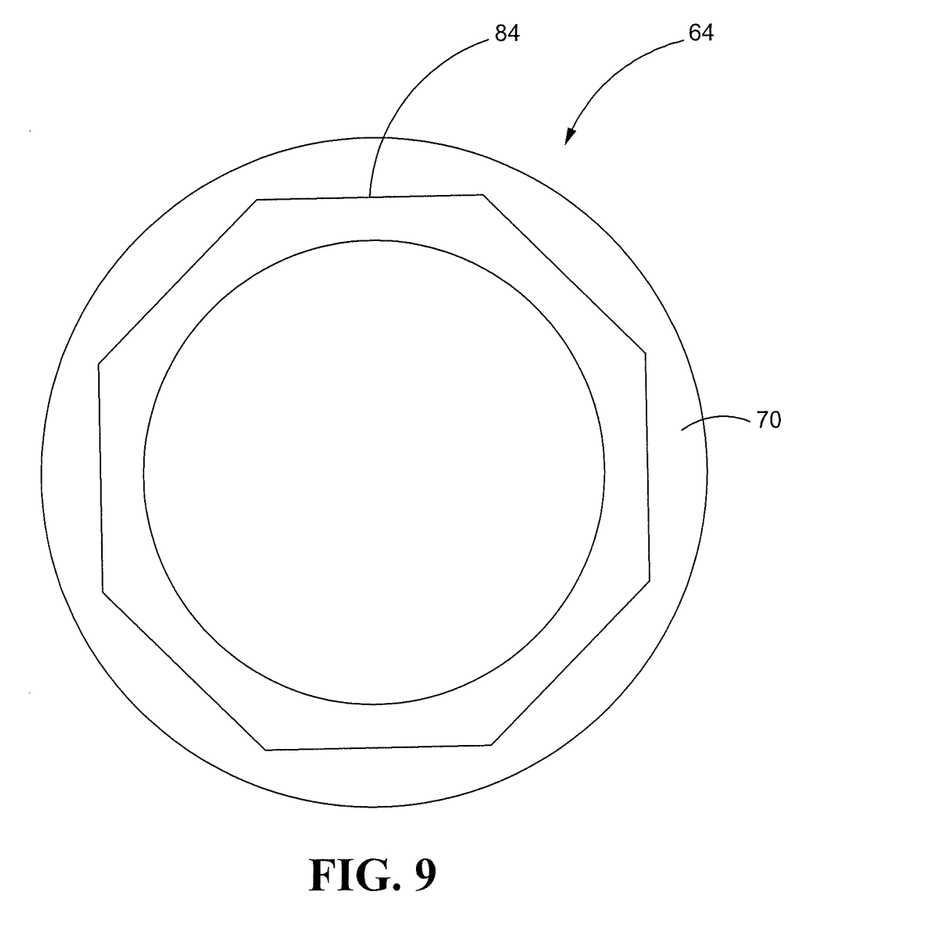
FIG. 9 is a plan view of the seal ring of FIG. 8.

Turning now to FIGS. 8 & 9, another embodiment of the present disclosure is depicted. While very similar to the first embodiment of FIGS. 6-8, the second embodiment shows that protrusion 84 can alternatively extend from the radial arm 70 of the seal ring 64, as opposed to its radial surface 80 of the load ring 66. The indentation 86 in such an embodiment is therefore provided in the radial surface 80 of the load ring 66, as opposed to the radial arm 70. Also similar to the first embodiment, the protrusion 84 and indentation 86 are non-circular, continuous, and circumscribe the seal assembly 54. Moreover, as shown in FIG. 9, the protrusion 84 is depicted in another continuous and non-circular shape, this time as an octagon. While different in shape than the wavy configuration of the first embodiment, the octagonal configuration for the protrusion 84 still prevents relative rotation between the seal ring 64 and load ring 66. Of course, while not depicted, it is also to be understood, that in yet other embodiments, the protrusions 84 and indentations 86 can be provided in both the axial and radial directions. With such embodiments, movement of the load ring 66, both rotationally and axially, with respect to the seal ring 64 will be avoided.

Figure 10:
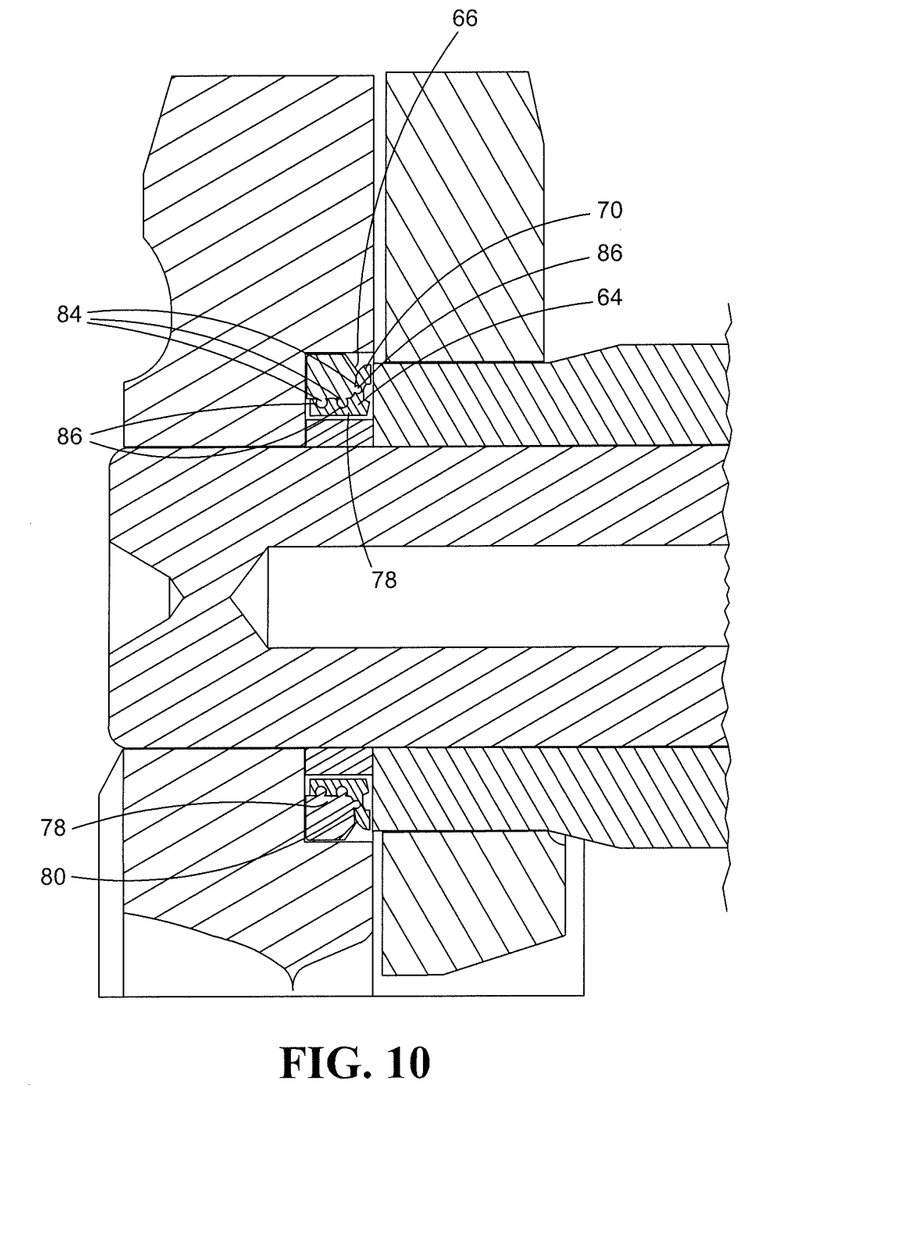
FIG. 10 is a sectional view similar to FIG. 5, but showing yet another alternative embodiment of the present disclosure.
Figure 11:
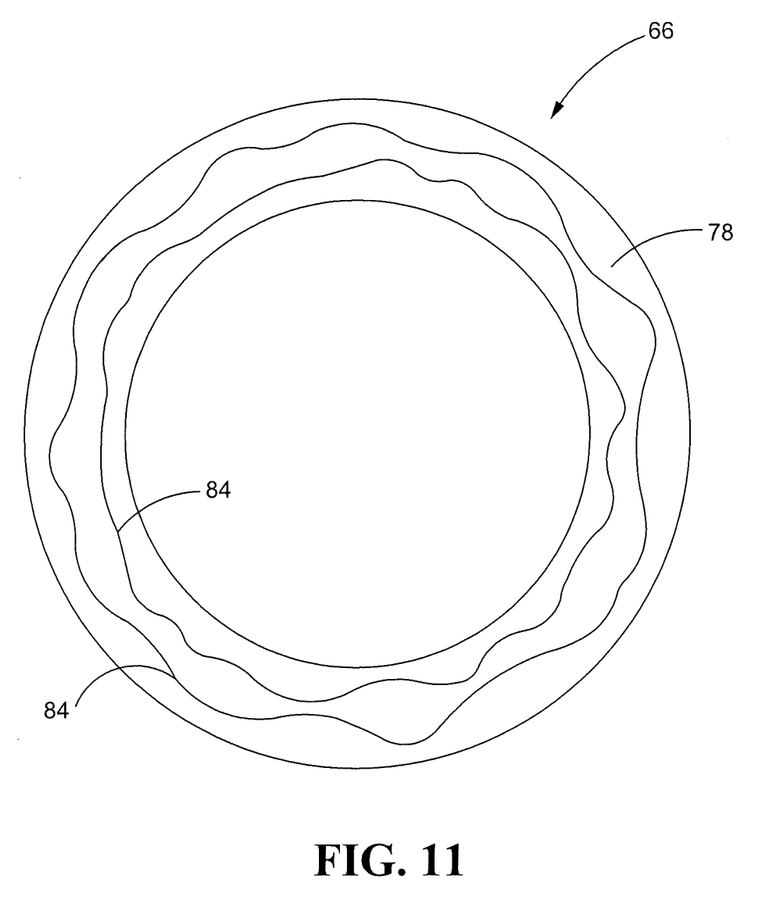
FIG. 11 is a plan view of the load ring of FIG. 10.

With respect to FIGS. 10 & 11, a still further embodiment is depicted as having more than one protrusion 84, and accordingly, more than one complementary indentation 86. Moreover, FIGS. 10 & 11 show that the indentation(s) 86 need not be provided as part of just the radial arm 70 of the seal ring 64 and/or the radial surface 80 of the load ring, but rather can be provided as part of the axial arm 68 and axial surface 78 instead of, or in addition to, the radial 70 and radial surface 80. Consequently, the indentation(s) 86 in such embodiments are provided in the seal ring 64, not the load ring 66. Also, while the protrusions 84 are shown as part of both the axial surface 78 and the radial surface 80 of the load ring 66, they could also be part of just the axial surface 78, or just the radial surface 80. Finally, as shown in FIG. 11, the protrusions 84 can also be relatively amorphous, and still be continuous and non-circular.

While each embodiment disclosed above is unique, it is important to note that all of the foregoing examples employ complementary surface deformations 83 which are non-circular and continuous so as to prevent relative rotation of the load ring 66 and seal ring 64. Each complementary surface deformation 83 may be wavy and symmetrical with major and minor arcs as with the first embodiment, but can also any other non-circular and continuous shape such as, but not limited to, oval, triangular, quadrilateral, pentagonal, hexagonal, octagonal and the like, as well as more amorphous non-circular shapes.

The present disclosure does not only include the foregoing apparatus, but also sets forth a method of assembling the seal assembly 54 as well. The method may include providing the seal ring 64, providing the load ring 66 proximate to the seal ring 64, and then connecting the load ring to the seal ring 64 using complementary surface deformations circumscribing the seal ring and the load ring, the complementary surface deformations being continuous and non-circular.

INDUSTRIAL APPLICABILITY

In operation, it can therefore be seen that the pending disclosure sets forth a seal assembly, an undercarriage link joint assembly, and a method of assembling a seal assembly which greatly improves upon the prior art.

More specifically, with many machines used in earth moving, agricultural, and construction applications, it is necessary to provide a constant lubrication supply to movable components of the machine such as track pins and linkage pins. The seal assembly of the present disclosure does so by connecting the load ring to the seal ring using non-circular, continuous, and complementarily shaped surface deformations.

In so doing, a labyrinthine pathway is defined between the load ring and seal ring which substantially prevents escape of the lubricant to the environment, and inflow of debris from the environment to the lubrication supply.

Moreover, it does so while at the same time substantially eliminating the ability of the load ring rotate relative to, and in some embodiments axially translate relative to, the seal ring. The constant contact between the load ring and seal ring is therefore maintained and, as both are housed within a lubrication cavity under compression, proper positioning of the components and sealing of the lubricant is maintained.

What is claimed is:

1. A seal assembly, comprising:
   a seal ring;
   a load ring in engagement with the seal ring;
   first complementary surface deformations in the seal ring, the complementary surface deformations circumscribing the seal ring, the first complementary surface deformations being continuous and non-circular; and
   second complementary surface deformations in the load ring, the second complementary surface deformations circumscribing the load ring, the second complementary surface deformations being continuous, non-circular, and the first and second complementary surface deformations are shaped to allow for one or both of the first and second complementary surface deformations to be inserted into the other in nesting fashion.

2. The seal assembly of claim 1, wherein the seal ring has an axial arm and a radial arm, and the load ring has an axial surface and a radial surface, the axial surface engaging the axial arm, the radial surface engaging the radial arm.

3. The seal assembly of claim 2, wherein the first complementary surface deformations are in the axial arm and the second complementary surface deformations are in the axial surface.

4. The seal assembly of claim 2, wherein the first complementary surface deformations are in the radial arm and the second complementary surface deformations are in the radial surface.

5. The seal assembly of claim 2, wherein the first complementary surface deformations are in the axial arm and the radial arm and the second complimentary surface deformations are in the axial surface and the radial surface.

6. The seal assembly of claim 1, wherein the first and second complementary surface deformations include a majority arc having a first radius and a minority arc having a second radius, the second radius being different than the first radius.

7. The seal assembly of claim 1, wherein the first and second complementary surface deformations have a shape selected from the group of shapes including: oval, triangular, quadrilateral, pentagonal, hexagonal, octagonal, and amorphous.

8. The seal assembly of claim 1, wherein the first complementary surface deformations are concentric with and radially outside of the second complementary surface deformations.

9. The seal assembly of claim 1, wherein the first complementary surface deformations in the seal ring include a protrusion and the second complementary surface deformations in the load ring include an indentation.

10. The seal assembly of claim 1, wherein the first complementary surface deformations in the seal ring include an indentation and the second complementary surface deformations in the load ring include a protrusion.

11. An undercarriage link joint assembly, comprising:
    a plurality of links;
    a pin joining adjacent links, the pin having first and second ends;
    a bushing surrounding the pin; and
    a seal provided at the first and second ends, the seal including a seal ring, a load ring, first complementary surface deformations circumscribing the seal ring, the complementary surface deformations being continuous and non-circular, and second complementary surface deformations in the load ring, the second complementary surface deformations circumscribing the load ring, the second complementary surface deformations being continuous, non-circular, and the first and second complementary surface deformations are shaped to allow for one or both of the first and second complementary surface deformations to be inserted into the other in nesting fashion.

12. The undercarriage link joint assembly of claim 11, further including a machine with which the undercarriage link joint assembly is operatively associated, the machine being one of a track-type tractor, a loader, a motor grader, a pipe layer, an excavator, a miner, a paver, and a truck.

13. The undercarriage link joint assembly of claim 11, further including a spacer, the spacer, plurality of links and bushing defining a lubrication cavity.

14. The undercarriage link joint assembly of claim 13, wherein the seal ring has an axial arm and a radial arm.

15. The undercarriage link joint assembly of claim 11, wherein the seal ring has an axial arm and a radial arm, the load ring has an axial surface and a radial surface, the axial arm is in engagement with the axial surface, the radial arm is in engagement with the radial surface, the first complementary surface deformations are in axial arm and the radial arm, and the second complementary surface deformations are in the axial surface and the radial surface.

16. The undercarriage link joint assembly of claim 11, wherein the first and second complementary surface deformations include a majority arc having a first radius and a minority arc having a second radius, the second radius being different than the first radius.

17. The undercarriage link joint assembly of claim 11, wherein the first and second complementary surface deformations have a shape selected from the group of shapes including: oval, triangular, quadrilateral, pentagonal, hexagonal, octagonal, and amorphous.

18. The undercarriage link joint assembly of claim 11, wherein the first complementary surface deformations in the seal ring include a protrusion and the second complementary surface deformations in the load ring include an indentation.

19. The undercarriage link joint assembly of claim 11, wherein the first complementary surface deformations in the seal ring include an indentation and the second complementary surface deformations in the load ring include a protrusion.

20. A method of assembling a seal assembly, comprising:
    providing a seal ring;
    providing a load ring proximate to the seal ring; and
    connecting the load ring to the seal ring using first and second complementary surface deformations, the first complementary surface deformations circumscribing the seal ring and being continuous and non-circular, the second complementary surface deformations circumscribing the load ring and being continuous, non-circular, and the first and second complementary surface deformations are shaped to allow for one or both of the first and second complementary surface deformations to be inserted into the other in nesting fashion.

\* \* \* \* \*